(12) United States Patent
Mori et al.

(10) Patent No.: US 6,839,213 B2
(45) Date of Patent: Jan. 4, 2005

(54) POWER CONVERTER OF ELECTRIC CAR OR HYBRID CAR

(75) Inventors: Kazuhisa Mori, Hitachi (JP); Takashi Ikimi, Hitachi (JP); Shuji Katoh, Hitachiota (JP); Yutaka Sato, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/213,377

(22) Filed: Aug. 7, 2002

(65) Prior Publication Data

US 2003/0052401 A1 Mar. 20, 2003

Related U.S. Application Data

(63) Continuation of application No. 10/096,454, filed on Mar. 13, 2002.

(30) Foreign Application Priority Data

Sep. 18, 2001 (JP) .......................................... 2001-282572

(51) Int. Cl.[7] .............................................. H02H 5/04
(52) U.S. Cl. ...................................... 361/103; 307/10.1
(58) Field of Search ......................... 361/103, 56, 93.1, 361/57; 701/22, 29, 36; 307/9.1, 10.1

(56) References Cited

U.S. PATENT DOCUMENTS

| | | | |
|---|---|---|---|
| 4,833,586 A | 5/1989 | Inaba et al. | |
| 5,097,421 A | 3/1992 | Maney et al. | |
| 5,323,440 A | 6/1994 | Hara et al. | |
| 5,455,409 A | 10/1995 | Smith et al. | |
| 5,586,250 A | 12/1996 | Carbonneau et al. | |
| 5,656,915 A | 8/1997 | Eaves | |
| 5,720,767 A | 2/1998 | Amely-Velez | |
| 5,760,492 A | 6/1998 | Kanoi et al. | |
| 5,805,438 A | 9/1998 | Takada et al. | |
| 5,835,700 A | 11/1998 | Carbonneau et al. | |
| 5,847,950 A | 12/1998 | Bhagwat | |
| 5,867,809 A | * 2/1999 | Soga et al. .................. | 702/130 |
| 5,995,774 A | 11/1999 | Applegate et al. | |
| 6,031,749 A | * 2/2000 | Covington et al. ........... | 363/98 |
| 6,188,206 B1 | * 2/2001 | Nguyen et al. ............. | 323/222 |
| 6,392,376 B1 | 5/2002 | Kobayashi et al. | |
| 2001/0047216 A1 | 11/2001 | Ando | |
| 2002/0082787 A1 | 6/2002 | Wodworth et al. | |
| 2002/0120417 A1 | 8/2002 | Naya et al. | |

FOREIGN PATENT DOCUMENTS

| | | |
|---|---|---|
| JP | 02063172 | 3/1990 |
| JP | 02234076 | 9/1990 |
| JP | 6-70553 | 3/1994 |

* cited by examiner

Primary Examiner—Gregory J. Toatley, Jr.
Assistant Examiner—James A Demakis
(74) Attorney, Agent, or Firm—McDermott Will & Emery LLP

(57) ABSTRACT

A semiconductor power module capable of efficiently utilizing the performance of the module and facilitating management of the module in custody. The semiconductor power module having one or more semiconductor power switching elements and a drive unit is provided with a non-volatile memory for storing use history of the module and a drive unit. The use history contains information of one of the number of switching times of the semiconductor power switching element, the number of over-current detections of the semiconductor power switching element and a temperature rise of the semiconductor power module.

6 Claims, 12 Drawing Sheets

DURING OPERATION

REUSE PERMITTED

REUSE DENIED

DURING OPERATION

DURING INFORMATION TRANSFER

POWER CONVERTER OF ELECTRIC CAR OR HYBRID CAR

This is a continuation of application Ser. No. 10/096,454, filed Mar. 13, 2002.

BACKGROUND OF THE INVENTION

1. Field of the Invention

The present invention relates to a semiconductor power module of a power converter used by general industrial machines and electric power systems, and to a power converter having such a power module.

2. Description of the Related Art

JP-A-6-70553 discloses a conventional power converter which has a function of diagnosing the life of the converter by storing electrical characteristics such as currents and voltages and maintenance history. According to this conventional technique, the life of a power converter is diagnosed by storing calculation results used for controlling the converter or maintenance history in a control unit of the power converter.

Even if information of use history and the like of a semiconductor power module is to be stored in the control unit, this information of use history and the like cannot be obtained from the semiconductor power module alone. Therefore, if a defective component other than the semiconductor power module is found in a power converter, the use history already stored is not inherited, and in some cases, the semiconductor power module as well as the defective component is replaced at the same time. Since the semiconductor power module is not used effectively but dumped, the amount of industrial wastes increases, which is not desired from the viewpoint of environments.

Each semiconductor power module has generally its own manufacture serial number. If a number of power semiconductor modules are to be managed by using only manufacture serial numbers, it takes time and labor for this management. In some cases, modules still not used and modules temporarily used cannot be distinguished.

SUMMARY OF THE INVENTION

It is an object of the invention to solve the problems associated with conventional techniques and provide a semiconductor power module capable of utilizing the performance of the module at a maximum and facilitating the management of the module in custody.

The above object can be achieved by providing a semiconductor power module with a function of storing use history and a function of displaying at least part of the use history or a message indicating the use history in excess of some conditions. By storing module characteristics evaluation results in the semiconductor power module itself, the management of the module can be facilitated.

The factor of governing the life of the semiconductor power module is a temperature rise in the module. The life of a semiconductor power module becomes shorter, the wider a temperature rise change in the module becomes. It is therefore important to diagnose the life from an internal temperature rise. If information of the temperature change is stored as use history in the semiconductor power module, the life of the module can be diagnosed from this information.

According to one aspect of the present invention, a semiconductor power module having one or more semiconductor power switching elements and a drive unit, comprises: non-volatile storage means for storing use history of the semiconductor power module; and display means for displaying the use history, wherein the use history contains information of one of the number of switching times of the semiconductor power switching element, the number of over-current detections of the semiconductor power switching element and a temperature rise of the semiconductor power module.

The non-volatile storage means may further store element characteristics data of the semiconductor power module.

The display means may be activated when one of the number of switching times of the semiconductor power switching element, the number of over-current detections of the semiconductor power switching element and a temperature rise of the semiconductor power module satisfies a predetermined condition.

According to another aspect of the present invention, in a power converter having a semiconductor power module including one or more semiconductor power switching elements and a drive unit, a power source unit and a module controller, the semiconductor power module comprises: non-volatile storage means for storing use history of the semiconductor power module; and output means for outputting the use history to an external of the semiconductor power module, wherein the use history contains information of one of the number of switching times of the semiconductor power switching element, the number of over-current detections of the semiconductor power switching element and a temperature rise of the semiconductor power module.

Other objects, features and advantages of the invention will become apparent from the following description of the embodiments of the invention taken in conjunction with the accompanying drawings.

DETAILED DESCRIPTION OF THE EMBODIMENTS

Embodiments of the invention will be described with reference to the accompanying drawings.

(First Embodiment)

Figure 1:
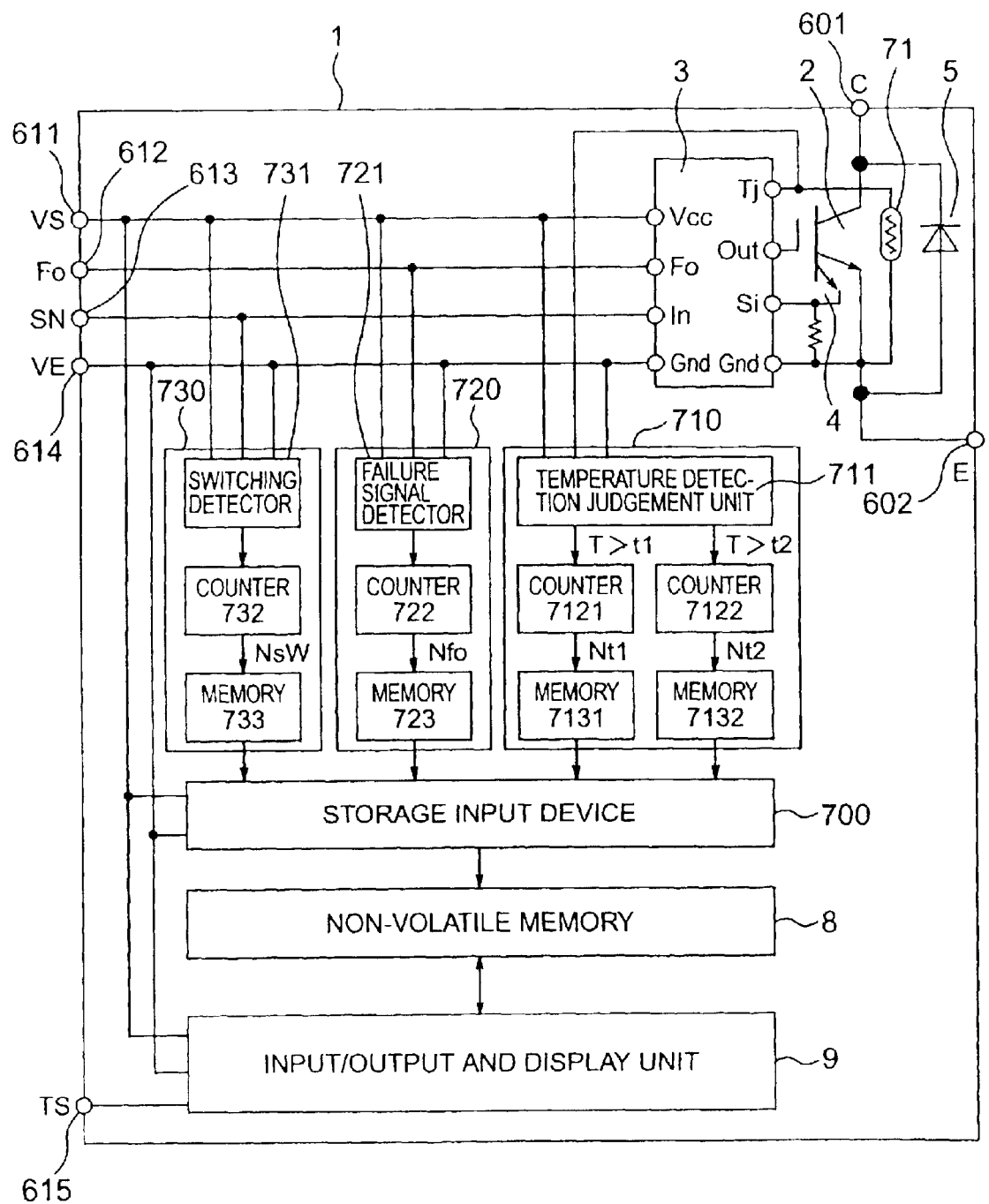
FIG. 1 is a diagram showing the outline of the internal structure of a semiconductor module according to a first embodiment.

FIG. 1 shows an example of the structure of a semiconductor power module (hereinafter abbreviated to semiconductor module) according to the first embodiment. The semiconductor module 1 has: a semiconductor switching element 2 typically an insulated gate type bipolar transistor (IGBT); a gate drive unit 3 for driving the switching element; a current sense IGBT 4 for sensing current; and a circulating current diode 5. The semiconductor module 1 has a structure generally called an intelligent power module (IPM) structure.

The semiconductor module 1 is provided with a collector (C) terminal 601 and an emitter (E) terminal 602 through which main current flows as well as control terminals including a power source (VS) terminal 611, an error output (Fo) terminal 612, a control signal (SN) terminal 613 and a ground (VE) terminal 614.

A predetermined power source is connected between the power source terminal 611 and ground terminal 614, and a pulse signal is applied to the control signal terminal 613 to control the on/off of the semiconductor switching element 2. The current sense IGBT 4 for sensing current detects an over-current and a temperature detector 71 detects a temperature rise. When an abnormal state is detected, an external control circuit can detect it at the error output terminal 612.

The above-described structure is the same as that of a general IPM. In this embodiment, the following function is provided. Namely, the semiconductor module is provided with: a temperature history storage unit 710 for storing temperature history represented by signals from the temperature detector 71; a failure history storage unit 720 for storing failure history by detecting error outputs; and a switching number storage unit 730 for storing the number of switching times corresponding to the number of control signals. Stored histories are stored in a non-volatile memory 8 under the control of a storage input/output unit 700. The semiconductor module 1 is further provided with an input/output and display unit 9 and a history evaluation terminal 615, the unit 9 being an interface for outputting the contents stored in the non-volatile memory 8 to an external circuit and inputting data from the external circuit. With this structure, the semiconductor module 1 of this embodiment can externally monitor the history information.

The temperature history storage unit 710 is constituted of a temperature detection judgement unit 711, two counters 7121 and 7122 and two memories 7131 and 7132. When a temperature T measured with the temperature detector 71 exceeds a predetermined temperature t1, the temperature detection judgement unit 711 sends a signal to the counter 7121 which counts up the count and stores it in the memory 7131. Similarly, when the temperature T exceeds a predetermined temperature t2, a signal is sent to the counter 7122 which counts up the count and stores it in the memory 7132.

In the failure history storage unit 720, a failure signal detector 721 detects a failure signal output from the gate drive unit 3 and sends a signal to a counter 722 which counts up the count and stores it in a memory 723. In the switching number storage unit 730, a switching detector 731 detects a control signal input from the external and sends a signal to a counter 732 which counts up the count and stores it in a memory 733. The data stored in these memories 7131, 7132, 723 and 733 is stored in the non-volatile memory 8 under the control of the storage input/output unit 700. When the semiconductor module is dismounted from the system, a power supply is stopped. The non-volatile memory is therefore used to maintain the data even if the power supply is stopped.

Figure 2:
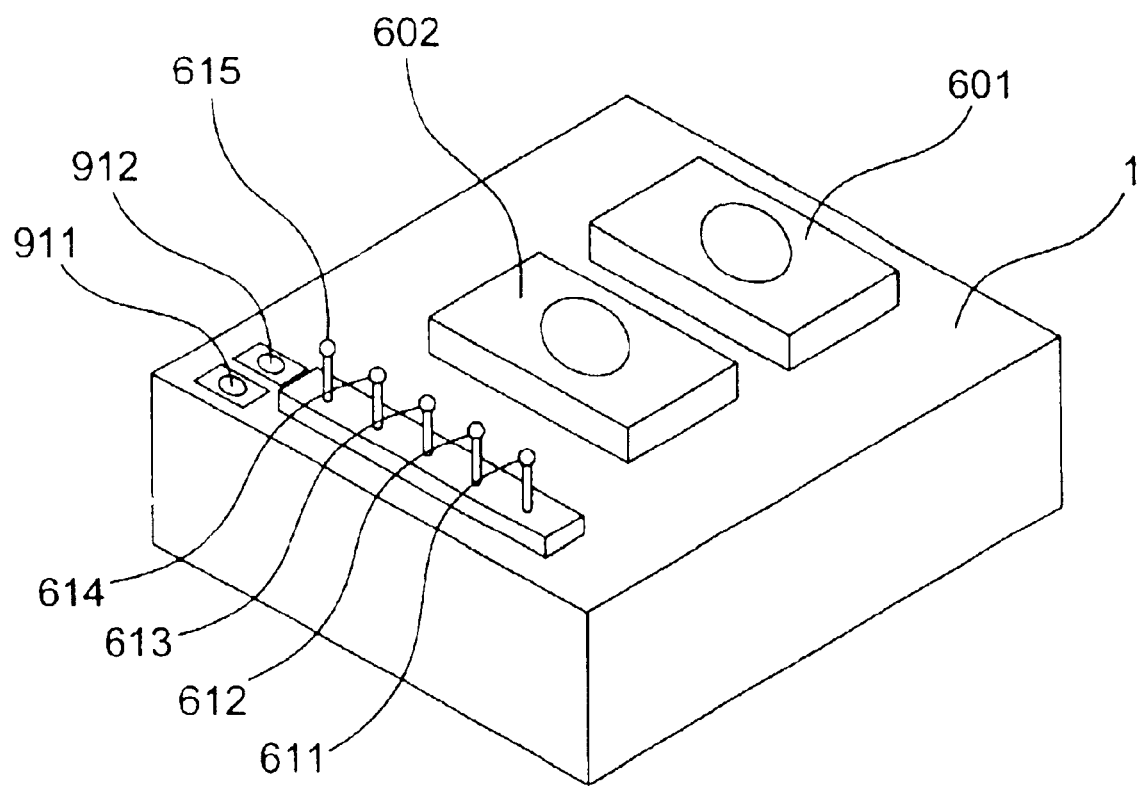
FIG. 2 is a perspective view of the semiconductor module of the first embodiment.

FIG. 2 is a perspective view of the semiconductor module 1 of the first embodiment. As shown in FIG. 2, the semiconductor module 1 has the collector terminal 601 and emitter terminal 602 as well as the control terminals including the power source terminal 611, error output terminal 612, control signal terminal 613, ground terminal 614 and history evaluation terminal 615. The semiconductor module 1 is also provided with a temperature history display unit 911 and a failure history display unit 912.

Figure 3:
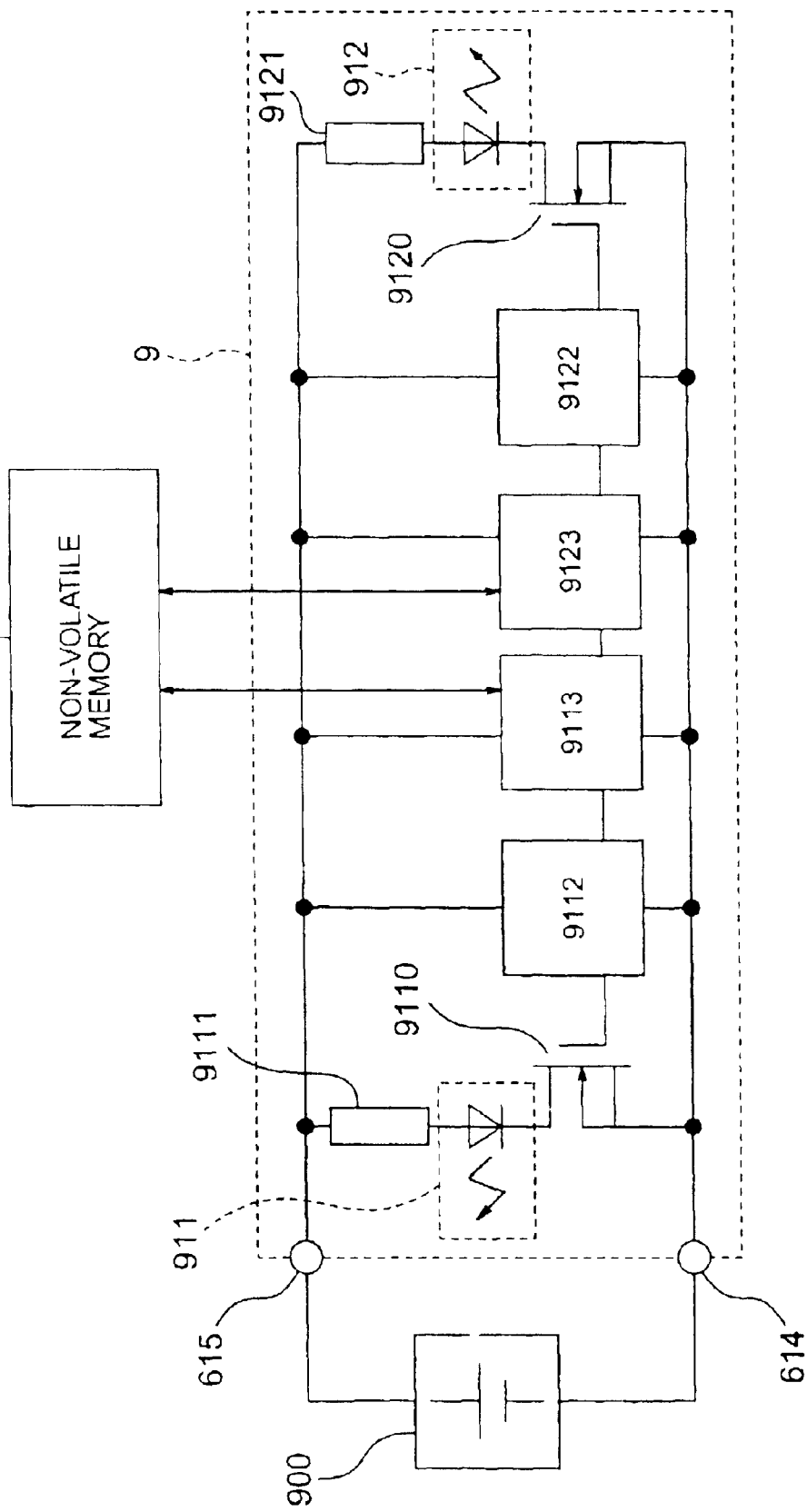
FIG. 3 shows an example of the structure of a history information input/output and display unit according to the first embodiment.

FIG. 3 shows the structure of the input/output and display unit 9 and the history evaluation terminal 615. By connecting a module history evaluation unit 900 between the ground terminal 614 and history evaluation terminal 615 respectively of the semiconductor module 1, the histories of the semiconductor module 1 are evaluated from the display contents of the temperature history display unit 911 and failure history display unit 912. More specifically, a memory read unit 9113 converts temperature information stored in the non-volatile memory 8 into a voltage signal. Upon reception of this signal, a history decision unit 9112 controls a switch 9110. For example, if the temperature history of the semiconductor module, i.e., the number of times exceeding the preset temperature, is smaller than a predetermined number, the history decision unit 9112 turns on the switch 9110 to flow current through a current limiting resistor 9111 and the temperature history display unit 911 to emit light from the display unit. Similarly, the failure history display unit 912 can emit light by using a memory read unit 9123, a history decision unit 9122, a switch 9120 and a current limiting resistor 9121.

With the structure described above, even if the semiconductor module 1 is detached from the controller of a power converter, the use histories of the semiconductor module 1 can be evaluated so that the used semiconductor module 1 can be utilized effectively. Generally, the life of the semiconductor module 1 or a smoothing capacitor takes a dominant role of a power converter. Therefore, reuse of only the semiconductor module 1 is rare. A semiconductor module is used for driving a motor of an electric car or a hybrid car. There may be a case, therefore, wherein even if the power converter is failed because of car accidents, the semiconductor module is not influenced at all. In such a case, although the use history can be checked to some extent from the running distance of the car, the use history relative to the internal temperature of the semiconductor module cannot be checked correctly from only the running distance. In such a case, if the use history is stored in the semiconductor module itself, reuse of the semiconductor memory is possible.

In the description with reference to FIGS. 2 and 3, although the evaluation results of the temperature and failure histories are displayed as the use histories, the evaluation result of the number of switching times may be displayed. Further, in the description with FIGS. 2 and 3, although an LED is used as the display unit which is easy to convert an electric signal into visual information, the embodiment is not limited only thereto. In this embodiment, the power of the LED display units, memory read units 9113 and 9123 and history decision units 9112 and 9122 is supplied from the history evaluation terminal 615. Instead, the power may be supplied from the power source terminal 611. In this case, the history evaluation terminal 615 is not necessary so that it becomes effective from the viewpoint of module mount. If a history evaluation terminal 615 is provided which is dedicated to the module history evaluation unit, the power of the semiconductor power module during operation can be reduced corresponding in amount to the power of LED's.

In the semiconductor module 1 shown in FIG. 2, the temperature history display unit 911 and failure history display unit 912 are mounted on the same plane as that of the collector terminal 601, emitter terminal 602, power source terminal 611, error output terminal 612, control signal terminal 613 and ground (VE) terminal 614. This is because it is preferable that the components projecting above the plane of the semiconductor module formed by hardening resin filled in a module mold are formed on a single plane. If there is no manufacture problem, the temperature history display unit 911 and failure history display unit 912 may be mounded on the side plane of the semiconductor module 1. If LED's are used for these display units as shown in FIG. 3 and the resin of the semiconductor module 1 is transparent, LED's may be mounted inside the module.

(Second Embodiment)

Figure 4:
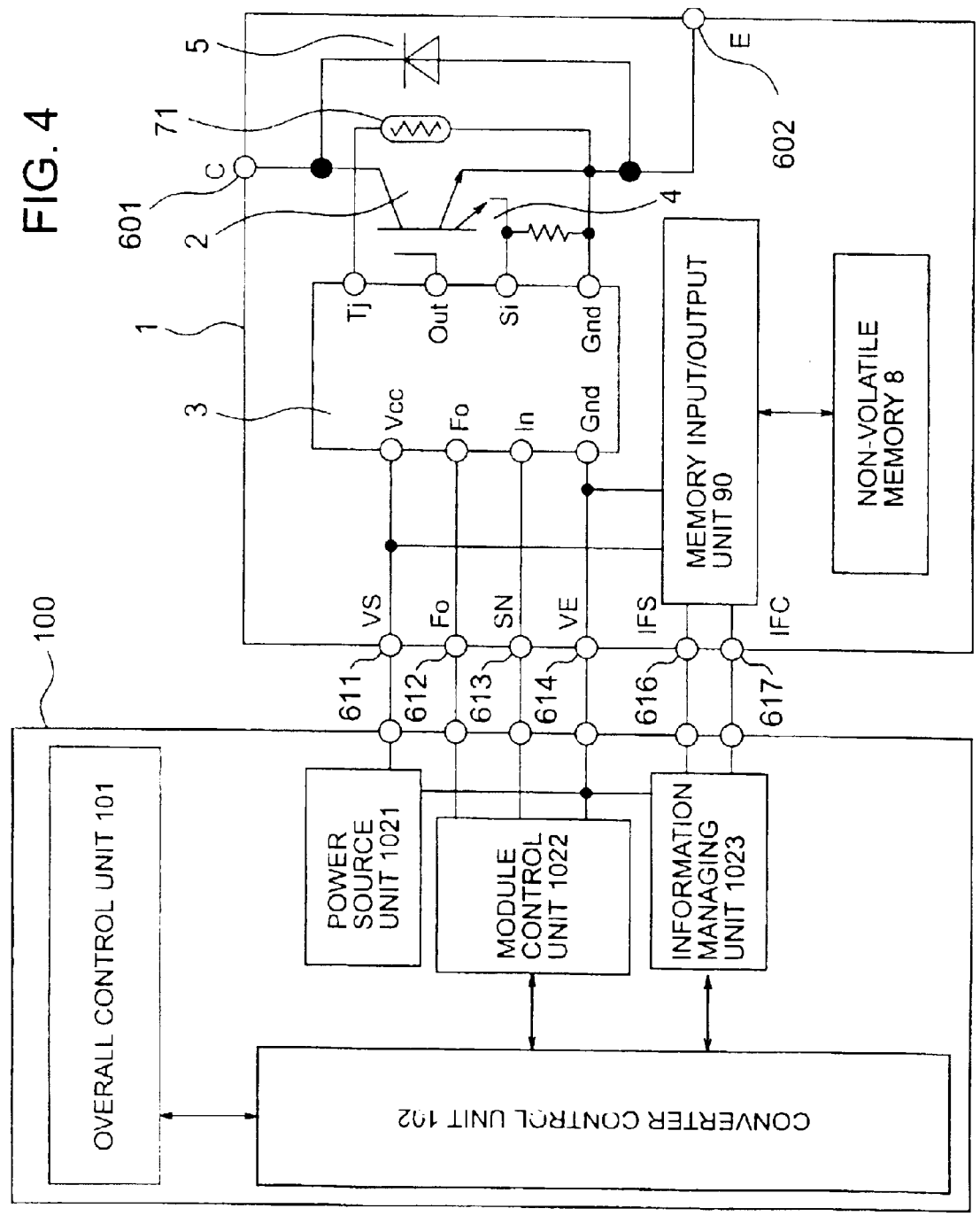
FIG. 4 is a diagram showing the outline of the structure of a power converter according to a second embodiment.
Figure 5:
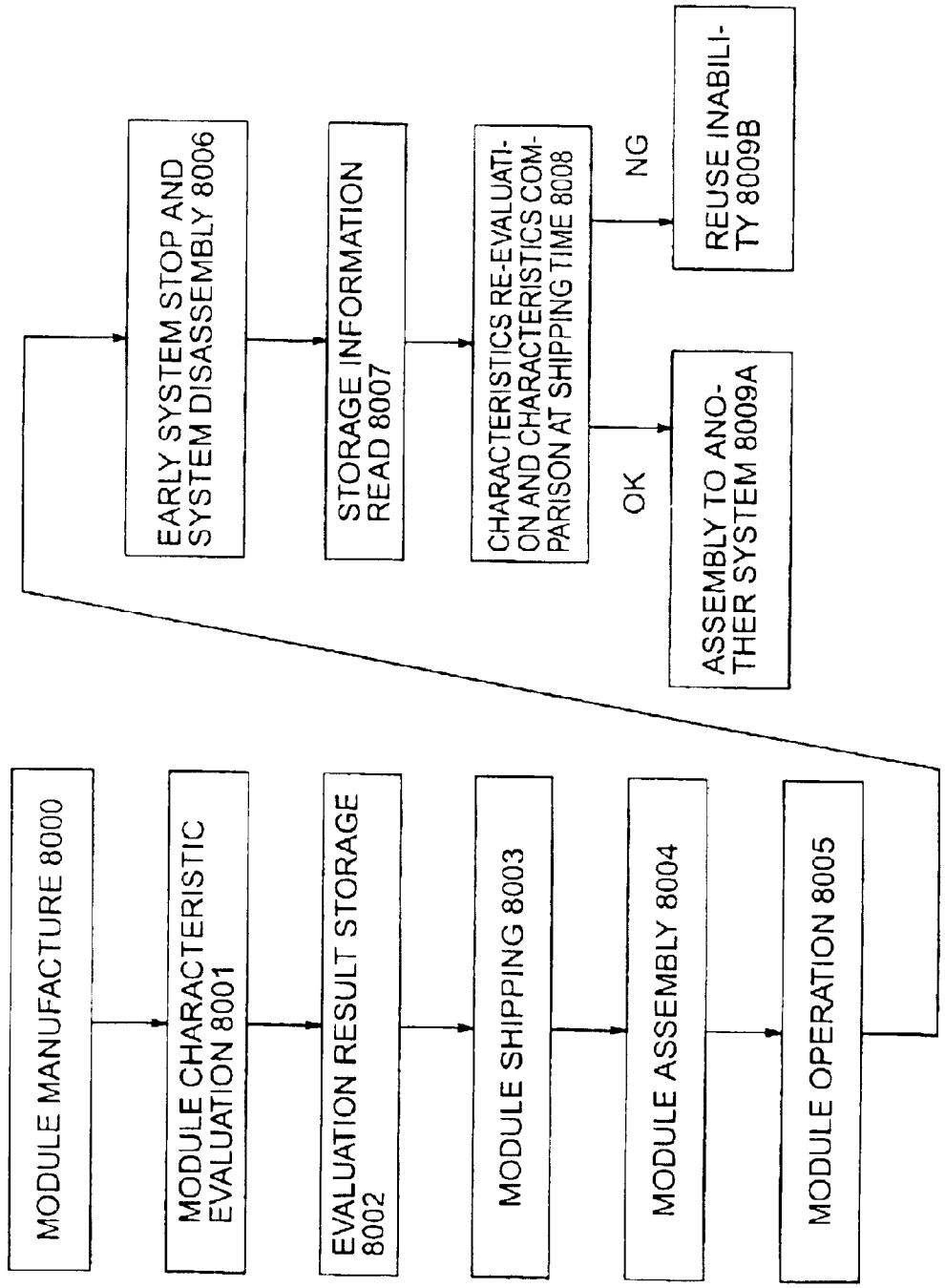
FIG. 5 shows a flow of using stored information of element characteristics according to a third embodiment.

FIG. 4 shows the second embodiment. Similar to the first embodiment shown in FIG. 1, a semiconductor module 1 shown in FIG. 4 is provided with a collector terminal 601 and an emitter terminal 602 through which main current flows, as well as control terminals including a power source terminal 611, an error output terminal 612, a control signal terminal 613 and a ground terminal 614.

A power source is connected between the power source terminal 611 and ground terminal 614, and a pulse signal is applied to the control signal terminal 613 to control the on/off of a semiconductor switching element 2. A current sense IGBT 4 for detecting current detects an over-current, and a temperature detector 71 detects a temperature rise. An external control circuit can detect an abnormal state from a signal at the error output terminal 612. In this embodiment, the semiconductor module 1 is further provided with a memory input/output unit 90, a non-volatile memory 8, a history information signal terminal 616 and a history information control terminal 617. Data can be read/written from/into the internal non-volatile memory 8 from an external of the semiconductor module 1.

A controller 100 is constituted of an overall control unit 100, a converter control unit 102, a power source unit 1021, a module control unit 1022 and an information managing unit 1023. For the purposes of drawing simplicity, only ones of the semiconductor module 1, power source unit 1021, module control unit 1022 and information managing unit 1023 are shown.

The overall control unit 101 is a hierarchically upper control unit than the converter control unit 102, and controls the whole of the system. The overall control unit 101 issues a command to the converter control unit 102 and reads a signal sent from the converter control unit 102. The module control unit 1022 for controlling the semiconductor module 1 applies a control signal to the control signal terminal 613 of the semiconductor module 1 in response to a command supplied from the converter control unit 102 which is a hierarchically upper control unit than the module control unit 1022. The module control unit 1022 detects a failure signal supplied from the error output terminal 612 of the semiconductor module and sends the failure signal to the converter control unit 102 in order to perform a protection operation for the converter and system.

The module control unit 1022 can detect the number of switching times and a failure signal, and the history information is stored in the internal non-volatile memory 8 of the semiconductor module 1 via the information managing unit 1023 and the internal memory input/output unit 90 of the semiconductor module 1. An interval of this information transmission may be longer than that of the gate signal from the module control unit 1022 so that a load on the converter control unit 102 and overall control unit 101 can be lowered. A general industrial machine has a suspension period in many cases. If stored information is transmitted during this suspension period, the intrinsic control performance cannot be influenced. For example, immediately when a driver of an electric automobile or hybrid automobile pulls out the automobile key, history information is written in the non-volatile memory 8, and when the key is inserted next, the history information is read and new history information is added thereafter. In this manner, the internal structure of the semiconductor module 1 can be simplified more than that shown in FIG. 1.

(Third embodiment)

The third embodiment will be described. A semiconductor module is manufactured (8000) which has a non-volatile memory 8, a memory input/output unit 90, a history information signal terminal 616 and a history information control terminal 617 similar to those of the second embodiment shown in FIG. 4. After the module characteristics are evaluated (8001), the evaluation results are stored (8002), and the module is shipped (8003). Next, the module is assembled (8004) to a system and activated (8005). If the system halts before the expected time because of some reason, the system is disassembled (8006) and stored information is read (8007). The module characteristics are evaluated again and compared (8008) with the characteristics at the shipping time. If there is no considerable deterioration and the like, the module is assembled (8009A) to another system, whereas if there is considerable deterioration and the like, it is judged (8009B) that the module is impossible to be reused. With this procedure, both the effective use and reliability of the semiconductor module can be established.

The evaluation items of the characteristics include saturation voltage (on-voltage), leak current, switching characteristics and the like. Other information such as a manufacture date may be added. This characteristic evaluation information is additionally used for judgement by the use history information in the first and second embodiments shown in FIGS. 1 and 4. Reliability of the semiconductor module to be reused can therefore be improved further.

(Fourth Embodiment)

Figure 6A:
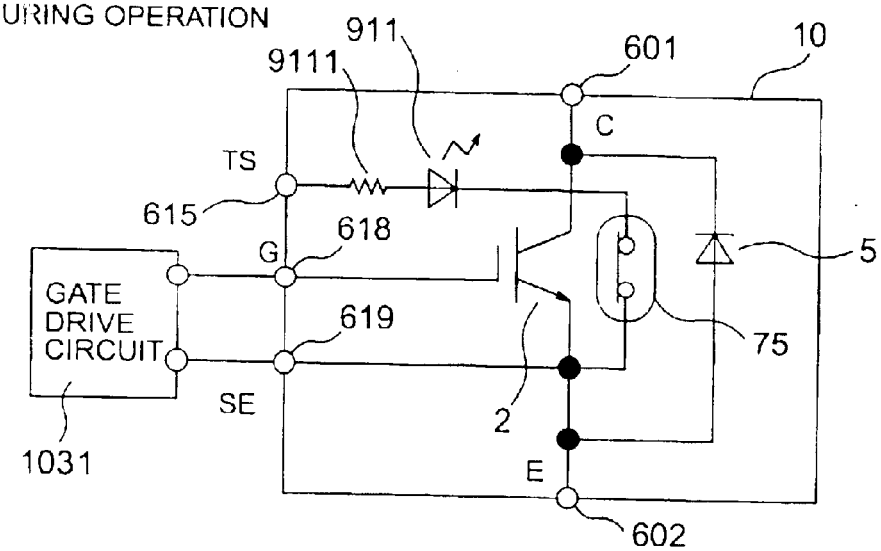
FIGS. 6A to 6C are diagrams showing the outline of the internal structure of a semiconductor module according to a fourth embodiment.
Figure 6B:
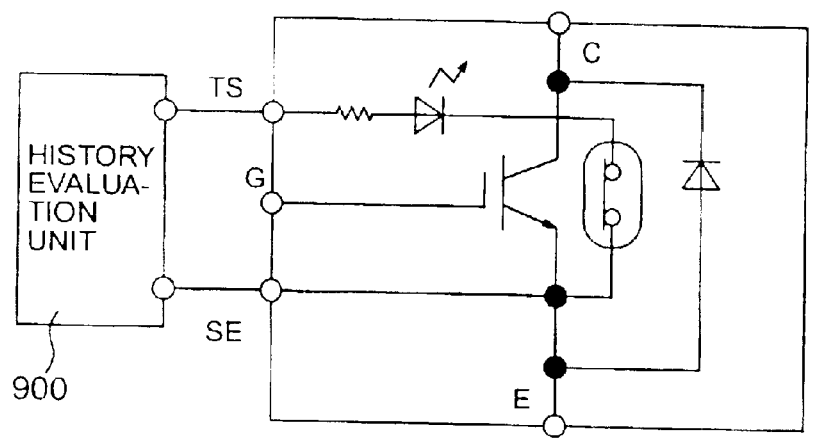
Figure 6C:
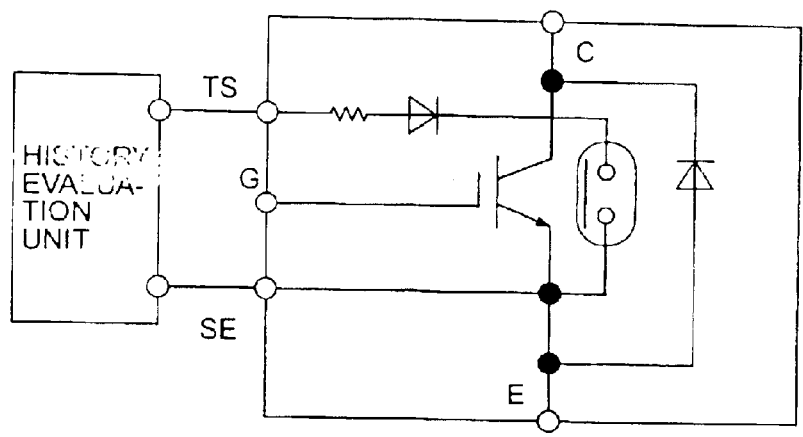

The fourth embodiment is shown in FIGS. 6A, 6B and 6C. A semiconductor module 10 of this embodiment is provided with a switching element 21, a circulating current diode 5, an irreversible switch 75, a collector terminal 601, an emitter terminal 602, a gate (G) terminal 618, a supplementary emitter (SE) terminal 619 and a history evaluation terminal 615.

As shown in FIG. 6A, this semiconductor module 10 is controlled by a gate drive circuit 1031 for applying a pulse voltage to the semiconductor switching element 2 to drive it, the gate drive circuit 1031 being connected between the gate terminal 618 and supplementary emitter terminal 619. As different from the first embodiment shown in FIG. 1, the semiconductor module does not include a power source. Therefore, the irreversible switch 75 which opens when a temperature rise cycle is repeated a predetermined number of times, is provided to store the use history in the module even if the power source is not included. As one example of module history evaluation, voltage is applied from a module history evaluation unit 900 via the history evaluation terminal 615 to a circuit having a temperature history display unit 911 such as LED and a current limiting resistor 9111 serially connected to the irreversible switch 75. While the irreversible switch 75 is not open because of the small number of temperature rise times of the semiconductor switching element 2, the temperature history display unit 911 emits light as shown in FIG. 6B. However, when the number of temperature rise times exceeds a predetermined time, the irreversible switch 75 opens so that the temperature history display unit 911 does not emit light as shown in FIG. 6C. In this case, the semiconductor module 10 is not reused.

(Fifth Embodiment)

The fifth embodiment will be described with reference to FIGS. 7 and 8. A semiconductor module 10 shown in FIG. 7 has the structure that a history detecting resistor 740 (R0 in FIG. 7) is serially connected to a circuit having three serial circuits connected in parallel and constituted of irreversible switches 751 to 753 (S1 to S3 in FIG. 7) and history detecting resistors 741 to 743 (R1 to R3 in FIG. 7). A module history evaluation unit 900 evaluates the characteristics of the semiconductor module by measuring a voltage Vo between a history evaluation input terminal 6151 and a history evaluation output terminal 6151 when a voltage Vs is applied between a supplementary emitter terminal 619 and history evaluation input terminal 6151 of the semiconductor module 10.

Figure 7:
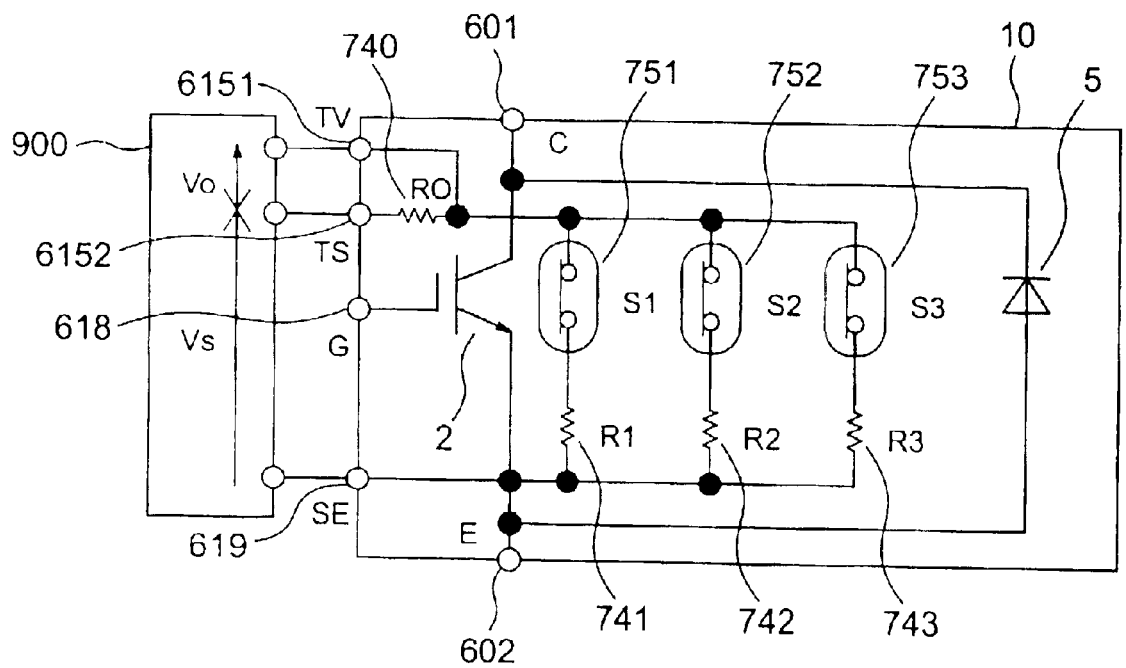
FIG. 7 is a diagram showing the outline of the internal structure of a semiconductor module according a fifth embodiment.
Figure 8:
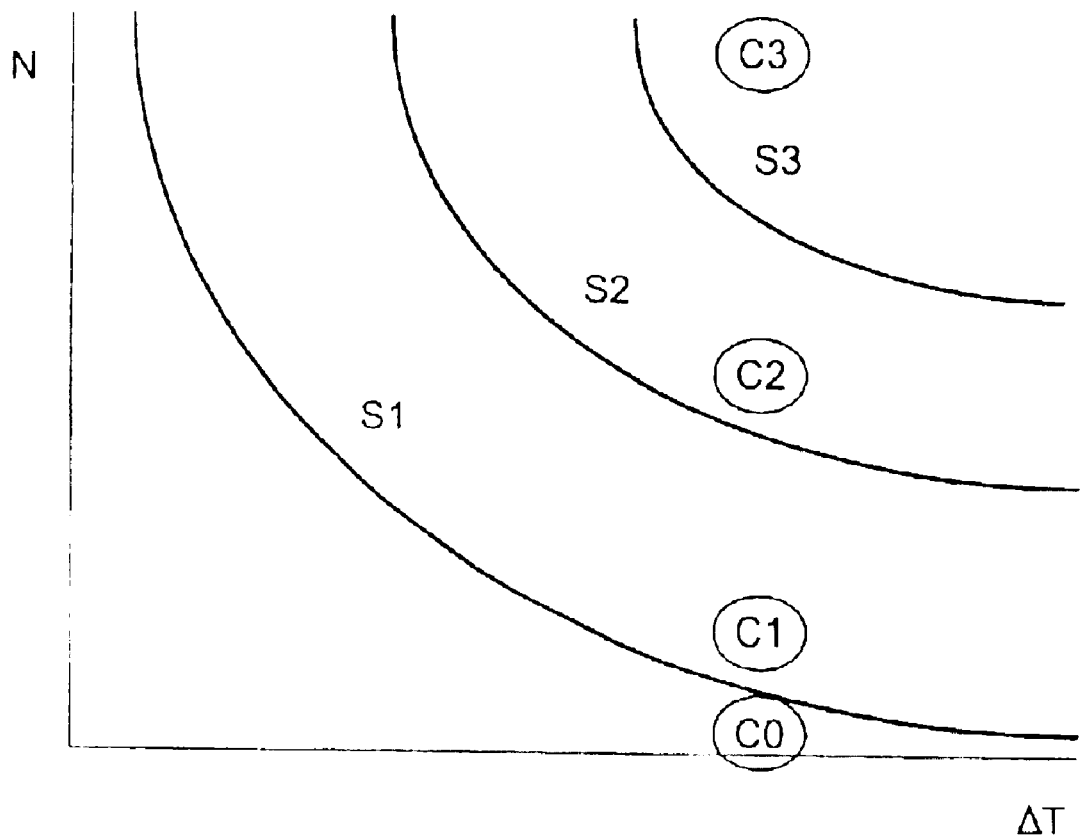
FIG. 8 is a graph showing an example of the characteristics of an irreversible switch of the fifth embodiment.

FIG. 8 shows the characteristics of three irreversible switches 751 to 753 (S1 to S3 in FIG. 7). In the graph shown in FIG. 8, the abscissa represents a temperature rise width ΔT and the ordinate represents the number N of times. In the right area of each curve, the irreversible switch opens. If the use history is in an area Co shown in FIG. 8, all switches are on so that a ratio of (evaluation output voltage Vo)/(input voltage Vs) is given by the following Equation 1.

$$Vo/Vs = \frac{R0}{R0 + \frac{R1 \cdot R2 \cdot R3}{R1 + R2 + R3}} \quad (1)$$

In an area C1 shown in FIG. 8, only the switch S1 opens so that the ratio is given by the following Equation 2.

$$Vo/Vs = \frac{R0}{R0 + \frac{R2 \cdot R3}{R2 + R3}} \quad (2)$$

In an area C2, since the switches S1 and S2 open, the ratio is given by the following Equation 3.

$$Vo/Vs = \frac{R0}{R0 + R3} \quad (3)$$

In an area C3, since all the switches are open, Vo=0. In this manner, the use history of the semiconductor module can be known from the evaluation output voltage Vo. In the structure shown in FIG. 7, although a serial circuit of the irreversible switch and resistor is used, in place of the history detecting resistors 741 to 743, three LED's may be connected to check the use history information from the LED on/off states. The number of irreversible switches connected in parallel may be increased to make the switches open and close in different areas more than three areas.

(Sixth Embodiment)

Figure 9:
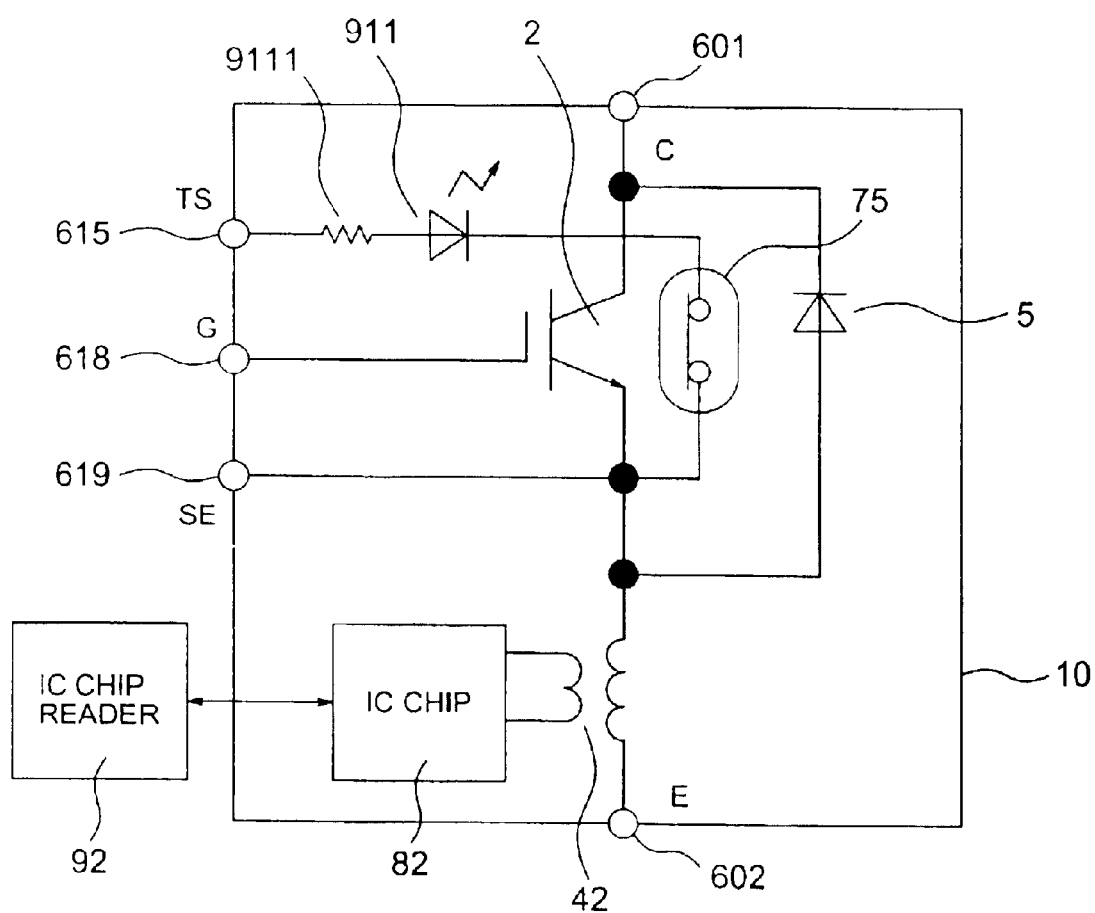
FIG. 9 is a diagram showing the outline of the internal structure of a semiconductor module according a sixth embodiment.

The sixth embodiment is shown in FIG. 9. In a semiconductor module shown in FIG. 9, the structure of the semiconductor module 10 shown in FIG. 6 is added with an IC chip input coil 42, an IC chip 82 and an IC chip reader 92. When current more than a predetermined current flows through the IC chip input coil 42, a signal is input to the IC chip 82 by electromagnetic induction of the coil so that conduction history information can be stored. Stored information is read with the IC chip reader so that it can be judged from the read information whether the semiconductor module 10 can be reused. With this structure, even a semiconductor module not having an internal constant voltage source, simple history information can be stored.

Figure 10:
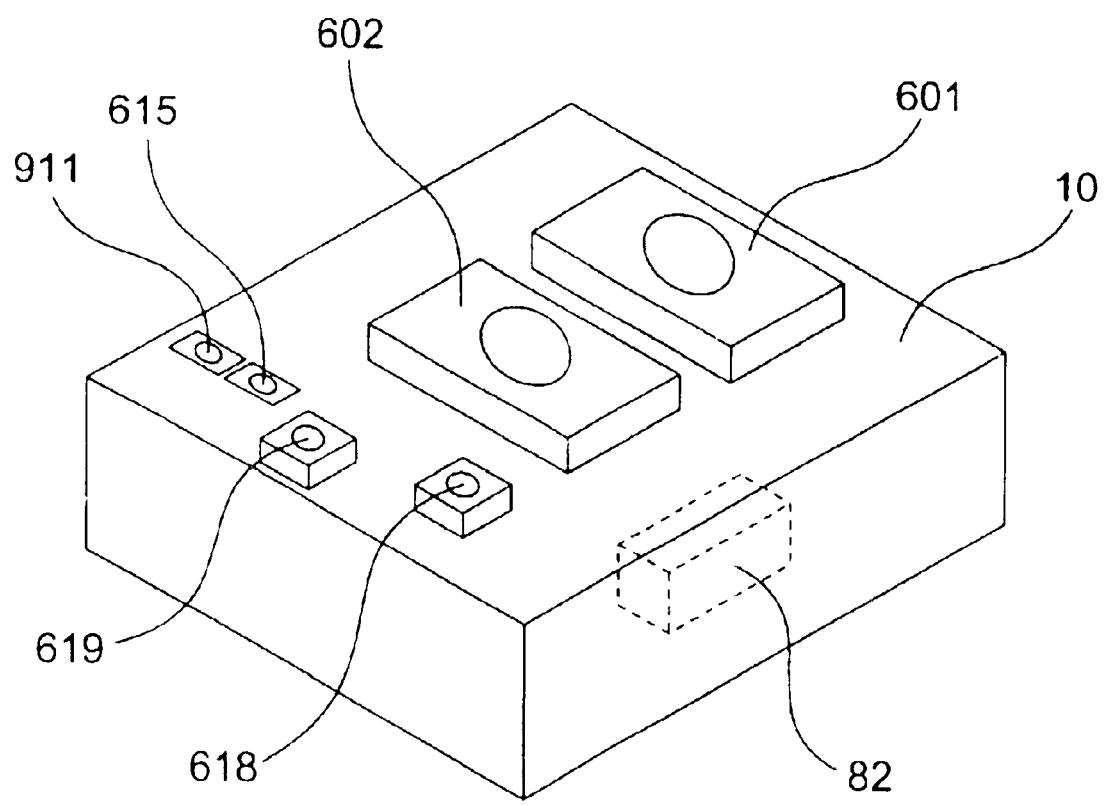
FIG. 10 is a perspective view of the semiconductor module of the sixth embodiment.

FIG. 10 is a perspective view of the semiconductor module of this embodiment. The semiconductor module 10 has a collector terminal 601 and an emitter terminal 602 through which current flows, as well as control terminals including a gate terminal 618 and a supplementary emitter terminal 619. The semiconductor module 10 also has an irreversible switch 75 for storing temperature history information, a temperature history display unit 911 of LED, a current limiting resistor 9111 and a history evaluation terminal 615. In this embodiment, since the characteristics of the semiconductor module cannot be judged only from the IC chip input coil 42, (both the temperature history information and IC chip input coil) are used. The position of the IC chip is not limited only to that shown in FIG. 10. However, in order to shorten the distance to the IC chip reader 92, the IC chip is contained in the side area or its nearby area of the semiconductor module 10.

Even those semiconductor modules unable to obtain the power source such as shown in FIGS. 6A, 7 and 9, the power source may be obtained by smoothing pulse voltages applied between the gate terminal 618 and supplementary emitter terminal 619 if the characteristics of the semiconductor switching element 2 is not influenced even if a circuit is connected between the gate and emitter. If it is allowed to make the circuit structure complicated to some extent and the module size large to some extent, the power source can be obtained by utilizing voltage applied between the collector terminal 601 and emitter terminal 602 during the off-state of the semiconductor switching element 3.

(Seventh Embodiment)

Figure 11A:
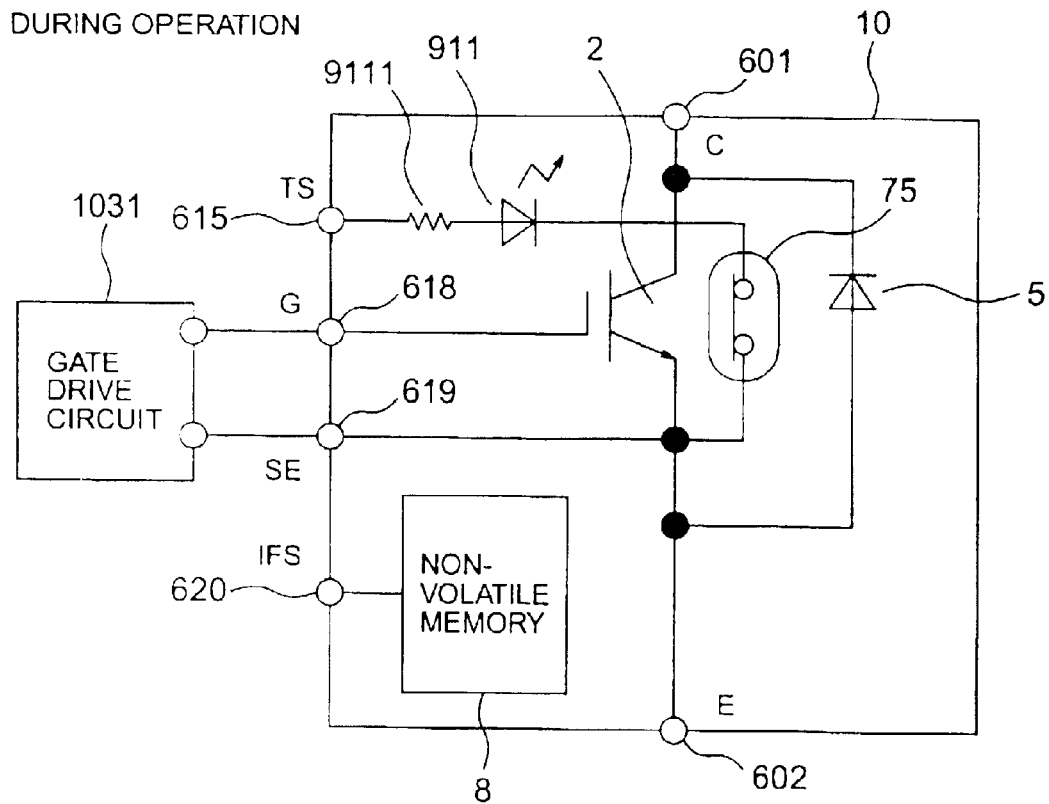
FIGS. 11A and 11B are diagrams showing the internal structure of a semiconductor module according a seventh embodiment.
Figure 11B:
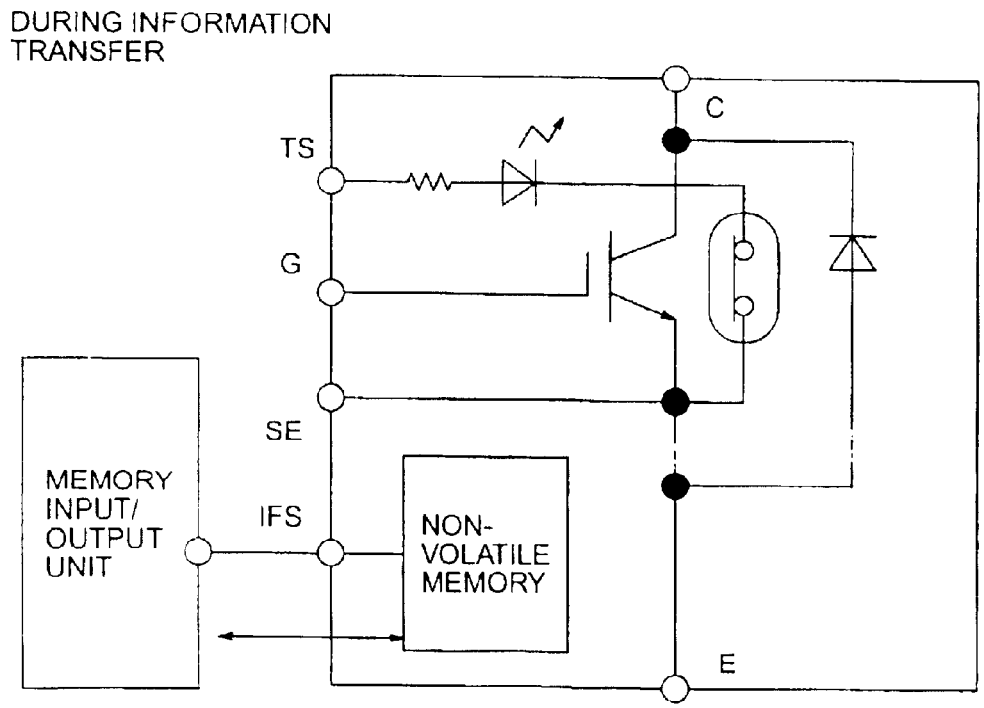

The seventh embodiment is shown in FIGS. 11A and 11B. A semiconductor module 10 shown in FIGS. 11A and 11B has therein a non-volatile memory 8 to and from which information is transferred via a memory input/output terminal 620 relative to an external memory Input/output unit 90. Information stored in the non-volatile memory 8 includes characteristics evaluation results or externally calculated history information.

Figure 12:
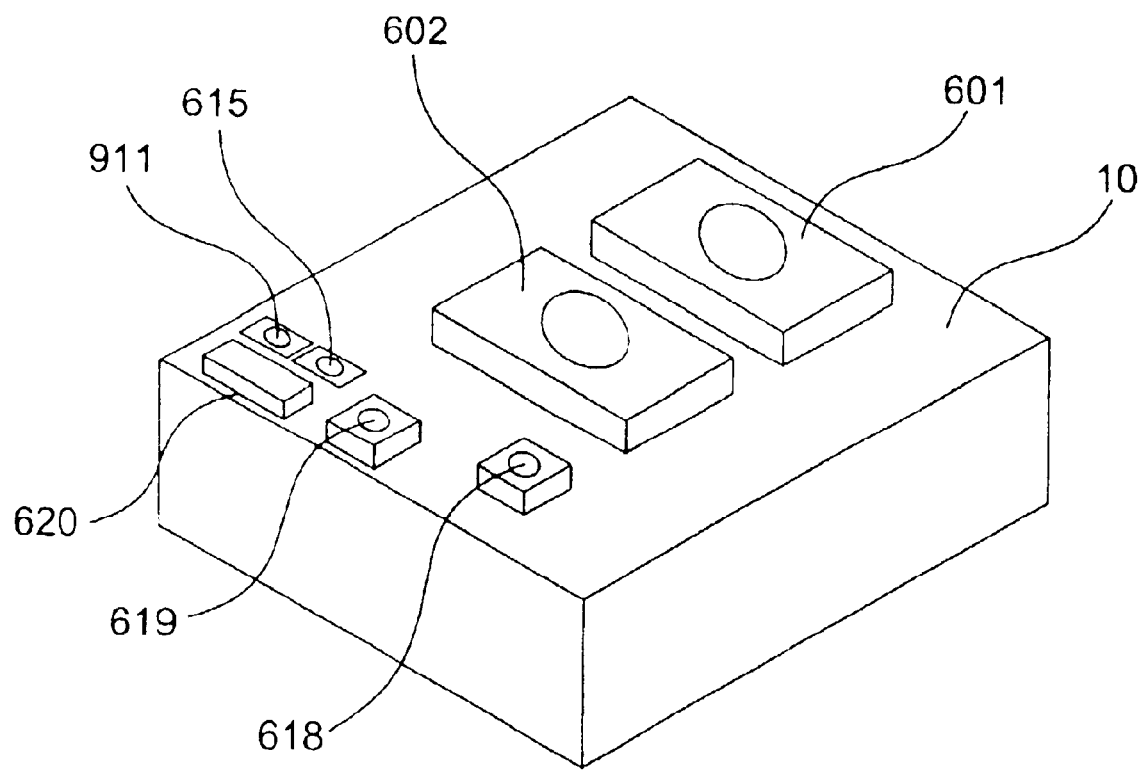
FIG. 12 is a perspective view of the semiconductor module of the seventh embodiment.

FIG. 12 is a perspective view of the semiconductor module 10 of this embodiment. Similar to the embodiment shown in FIG. 9, the semiconductor module 10 has a collector terminal 601, an emitter terminal 602, a gate terminal 618, a supplementary emitter terminal 619, a history evaluation terminal 615 and a temperature history display unit 911 as well as a memory input/output terminal 620. During the operation of the power converter, a cover is put on the memory input/output terminal 620 in order to prevent the non-volatile memory 8 from being applied with a voltage because of some troubles and prevent the storage contents from being destroyed.

In the above-described embodiments of the invention, although IGBT is used as the semiconductor switching element by way of example, the embodiments are not limited only thereto. The module outer shape is not limited only to those shown in the accompanying drawings, but various outer shapes are possible. Although one switching element is used in the semiconductor module by way of example, a semiconductor module may obviously have a plurality of switching elements.

According to the invention, since the semiconductor module itself stores its use history and displays its information, the performance of the module can be utilized at a maximum. Since the use history and characteristics of modules in custody can be known from the module themselves, module management can be facilitated.

It should be further understood by those skilled in the art that the foregoing description has been made on embodiments of the invention and that various changes and modifications may be made in the invention without departing from the spirit of the invention and the scope of the appended claims.

What is claimed is:

1. A power converter, comprising:

a semiconductor power module having one or more semiconductor power switching elements and a drive unit, the semiconductor power module containing non-volatile storage means for storing use history of the semiconductor power module, wherein the use history is written in the non-volatile storage means when pulling out a key of an electric automobile or a hybrid automobile; and display means for displaying the use history.

2. A power converter according to claim 1, wherein the storage means for the semiconductor power module of the power converter stores information of one of: the number of switching times of the one or more semiconductor power switching elements, the number of over-current detections of the one or more semiconductor power switching elements, and a temperature rise of the semiconductor power module.

3. A power converter according to claim 1, wherein the semiconductor power switching element is an insulated gate type bipolar transistor.

4. A power converter according to claim 1, wherein the use history is written in the non-volatile storage means by being added therein.

5. A power converter, comprising:

a semiconductor power module comprising at least one semiconductor power switching element, and a drive unit;

non-volatile memory for storing data regarding history of usage of the semiconductor power module of the power converter, wherein the history of usage is written in the non-volatile memory in response to removal of a key from an automobile which uses the power converter; and a display, for displaying the data regarding history of usage of the semiconductor power module.

6. A power converter according to claim 5, wherein the history of usage is written in the non-volatile memory by being added therein.

* * * * *